US006691286B1

(12) United States Patent
McElvain et al.

(10) Patent No.: US 6,691,286 B1
(45) Date of Patent: Feb. 10, 2004

(54) METHODS AND APPARATUSES FOR CHECKING EQUIVALENCE OF CIRCUITS

(75) Inventors: Kenneth S. McElvain, Los Altos, CA (US); David S. Rickel, Sunnyvale, CA (US)

(73) Assignee: Synplicity, Inc., Sunnyvale, CA (US)

( * ) Notice: Subject to any disclaimer, the term of this patent is extended or adjusted under 35 U.S.C. 154(b) by 96 days.

(21) Appl. No.: 10/020,546

(22) Filed: Oct. 29, 2001

Related U.S. Application Data

(60) Provisional application No. 60/244,784, filed on Oct. 31, 2000.

(51) Int. Cl.[7] .......................... G06F 17/50; G01G 23/01
(52) U.S. Cl. ...................... 716/3; 716/1; 716/2; 716/5; 702/109; 703/15
(58) Field of Search .................... 716/3, 1–2, 4–12; 702/109; 703/15

(56) References Cited

U.S. PATENT DOCUMENTS

| | | | | |
|---|---|---|---|---|
| 6,226,777 B1 | * | 5/2001 | Zhang | 716/5 |
| 6,253,351 B1 | * | 6/2001 | Fukui et al. | 716/2 |
| 6,321,173 B1 | * | 11/2001 | Foster | 702/109 |
| 6,321,186 B1 | * | 11/2001 | Yuan et al. | 703/15 |
| 6,449,750 B1 | * | 9/2002 | Tsuchiya | 716/4 |
| 6,453,449 B1 | * | 9/2002 | Wada | 716/5 |
| 6,457,162 B1 | * | 9/2002 | Stanion | 716/7 |
| 6,473,884 B1 | * | 10/2002 | Ganai et al. | 716/3 |
| 6,526,551 B2 | * | 2/2003 | Xie et al. | 716/5 |
| 2001/0010090 A1 | * | 7/2001 | Boyle et al. | 716/2 |
| 2002/0108093 A1 | * | 8/2002 | Moondanos et al. | 716/4 |
| 2002/0188922 A1 | * | 12/2002 | Ginneken et al. | 716/18 |
| 2003/0066039 A1 | * | 4/2003 | Zhong et al. | 716/5 |

OTHER PUBLICATIONS

Rajeev K. Ranjan, et al., "Using Combinational Verification for Sequential Circuits," *Proceedings on Conference on Design Automation and Test (Europe)* 1999, pp. 1–10.

* cited by examiner

*Primary Examiner*—Vuthe Siek
*Assistant Examiner*—Magid Y Dimyan
(74) *Attorney, Agent, or Firm*—Blakely, Sokoloff, Taylor & Zafman LLP

(57) ABSTRACT

Methods and systems for designing integrated circuits. In one exemplary method, a first plurality of points in a first representation of a circuit are identified, and the first representation is modified to produce a second representation for which a second plurality of points are identified. The first representation is compared to the second representation at the first plurality and second plurality of points to determine whether the first representation is equivalent to the second representation. Other features and embodiments are also described.

46 Claims, 9 Drawing Sheets

| LEGAL VALUES $EQ_O$ AND $EQ_I$ |
|---|
| 0 0 0 |
| 0 0 1 |
| 0 1 0 |
| 0 1 1 |
| 1 0 0 |

FIG. 6A

| OUTPUT | VALUE MAPS | INPUT | |
|---|---|---|---|
| $EQ_O$ (FOR INITIAL CIRCUIT) | $EQ_O'$ (FOR OPTIMIZED CIRCUIT) | $EQ_I$ (INITIAL) | $EQ_I'$ (OPTIMIZED) |
| 0 0 0 | 1 1 1 | 0 0 0 | 1 1 1 |
| 0 0 1 | 0 1 1 | 0 0 1 | 0 1 1 |
| 0 1 0 | 0 0 1 | 0 1 0 | 0 0 1 |
| 0 1 1 | 1 0 0 | 0 1 1 | 1 0 0 |
| 1 0 0 | 1 1 0 | 1 0 0 | 1 1 0 |
| ↳ 371 | ↳ 372 | ↳ 373 | ↳ 374 |

FIG. 6B

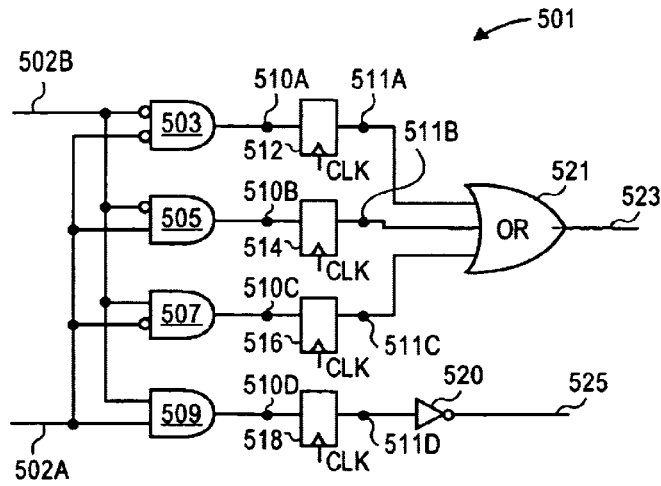
FIG. 8A
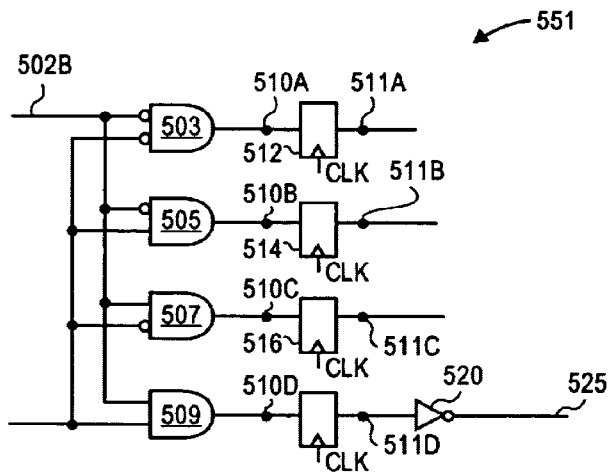
FIG. 8B
| EQ<sub>in</sub> | EQ<sub>in</sub>' | EQ<sub>out</sub> | EQ<sub>out</sub>' |
|---|---|---|---|
| 0001 | 0001 | 0001 | 0001 |
| 0010 | 0010 | 0010 | 0010 |
| 0100 | 0100 | 0100 | 0100 |
| 1000 | 1000 | 1000 | 1000 |
FIG. 8C

METHODS AND APPARATUSES FOR CHECKING EQUIVALENCE OF CIRCUITS

RELATED APPLICATIONS

This application is related to and claims the benefit of provisional U.S. patent application Ser. No. 60/244,784 filed Oct. 31, 2000, which is hereby incorporated herein by reference in its entirety.

FIELD OF THE INVENTION

The present invention relates generally to the field of designing (e.g. verifying) integrated circuits and, more particularly, to the design of integrated circuits which may be modified or optimized during a design process.

BACKGROUND OF THE INVENTION

For the design of digital circuits on the scale of VLSI (Very Large Scale Integration) technology, designers often employ computer aided techniques. Standard languages such as hardware description languages (HDLs) have been developed to describe digital circuits to aid in the design and simulation of complex digital circuits. Several hardware description languages, such as VHDL and Verilog, have evolved as industry standards. VHDL and Verilog are general purpose hardware description languages that allow definition of a hardware model at the gate level, the register transfer level (RTL), or the behavioral level using abstract data types. As device technology and design technology continues to advance, various product design tools have been developed to adapt HDLs for use with newer devices and design styles and to also allow for the optimization of a design after the compilation of an HDL code which describes a particular circuit.

FIG. 1 shows an example in the prior art in which a circuit is initially designed and then optimized in the design process. The optimized design typically must be compared with the original design to verify that the optimized design is equivalent to the initial or original design. This is often required because the optimization process may result in a change to the design which causes the second design (e.g. an optimized design) to not be an equivalent circuit such that the optimized design does not produce the same result for a given input as the initial design. The process of FIG. 1 begins in step 10 in which an HDL code is prepared for a particular circuit. This code is typically compiled in an HDL compiler to generate a first RTL representation. This is shown as process element 12. Then in process element 14, the first RTL representation is processed in order to optimize the design which results in a second RTL representation. Then in process element 16, a verification tool, such as a commercially available verification software product, is used to check for equivalence between the first RTL representation and the second RTL representation. In process element 18, the use of this tool results in a test to determine whether the two representations are equivalent. If these two representations are not equivalent, this results in an error message being displayed to the designer by the verification tool in process element 19. On the other hand, if the verification tool can verify that the two representations are equivalent, then an indication of this equivalence is displayed to the designer and the process may proceed to process element 20 in which place and route tools are used to create an integrated circuit from the second RTL representation.

Present verification tools have very little ability to handle optimizations, particularly sequential optimizations, such as the first RTL representation. For example, these optimizations may include in sequence, sequential redundancy removal, state machine re-encoding, flip-flop replication, retiming, pipelining, half-cycle scheduling, and conversions between clock gating and enables. Thus the verification tools which exist in the prior art, when used in process element 16 discussed above, typically fail to verify the equivalence between the initial circuit and an optimized version of the circuit even when they are equivalent. Thus, too many error messages result (process element 19 of FIG. 1), resulting in increased cost and delay in designing the desired integrated circuit.

SUMMARY OF THE INVENTION

The present invention discloses methods and apparatuses for designing (e.g. verifying) one or more integrated circuits. According to one aspect of the present invention, an exemplary method for designing an integrated circuit includes identifying a first plurality of points in a first representation of a circuit which represents the integrated circuit, and modifying the first representation to produce a second representation which differs from the first representation, and maintaining a list of changes made during the modifying (wherein the list includes at least one change caused by the modifying), and identifying, from the list, a correspondence between a second plurality of points in the second representation and the first plurality of points (e.g. an association between a subset of the first plurality of points and a subset of the second plurality of points). According to this exemplary method, the first representation is compared with the second representation at the first plurality of points and the second plurality of points, and this comparison indicates whether the first representation is equivalent to the second representation.

According to another aspect of the invention, an exemplary method of designing an IC includes modifying a first representation, which represents at least a portion of the IC, to produce a second representation which differs from the first representation, and determining an initialization sequence for the first representation, and determining first simulated states for the first representation, where the first simulated states are derived from the initialization sequence over a plurality of simulated clock cycles, and comparing the first representation with the second representation in order to determine whether the first representation is equivalent to the second representation.

The present invention also discloses apparatuses, including software media which may be used to design integrated circuits. For example, the present invention includes digital processing systems which are capable of designing integrated circuits according to the present invention, and the invention also includes machine readable media, which when executed on a digital processing system such as a computer system, causes the digital processing system to execute a method for designing integrated circuits.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 6A shows a table indicating legal values for equivalent points in the initial circuit representation.

FIG. 6B shows a mapping of values at equivalent points for the initial circuit and for the optimized circuit.

FIG. 8A shows another example of an initial circuit, and FIG. 8B shows an example of an optimized version of the circuit of FIG. 8A.

FIG. 8C shows an example of a value map showing the conversion between equivalent points for the initial circuit of FIG. 8A and the optimized version of this initial circuit, which is shown in FIG. 8B.

DETAILED DESCRIPTION

Methods and apparatuses for designing an integrated circuit are described herein. In the following description, for purposes of explanation, numerous specific details are set forth to provide a thorough understanding of the present invention. It will be evident, however, to one skilled in the art that the present invention may be practiced without these specific details. In other instances, well known structures, processes, and devices are shown in block diagram form or are referred to in a summary manner in order to provide an explanation without undue detail.

Figure 1:
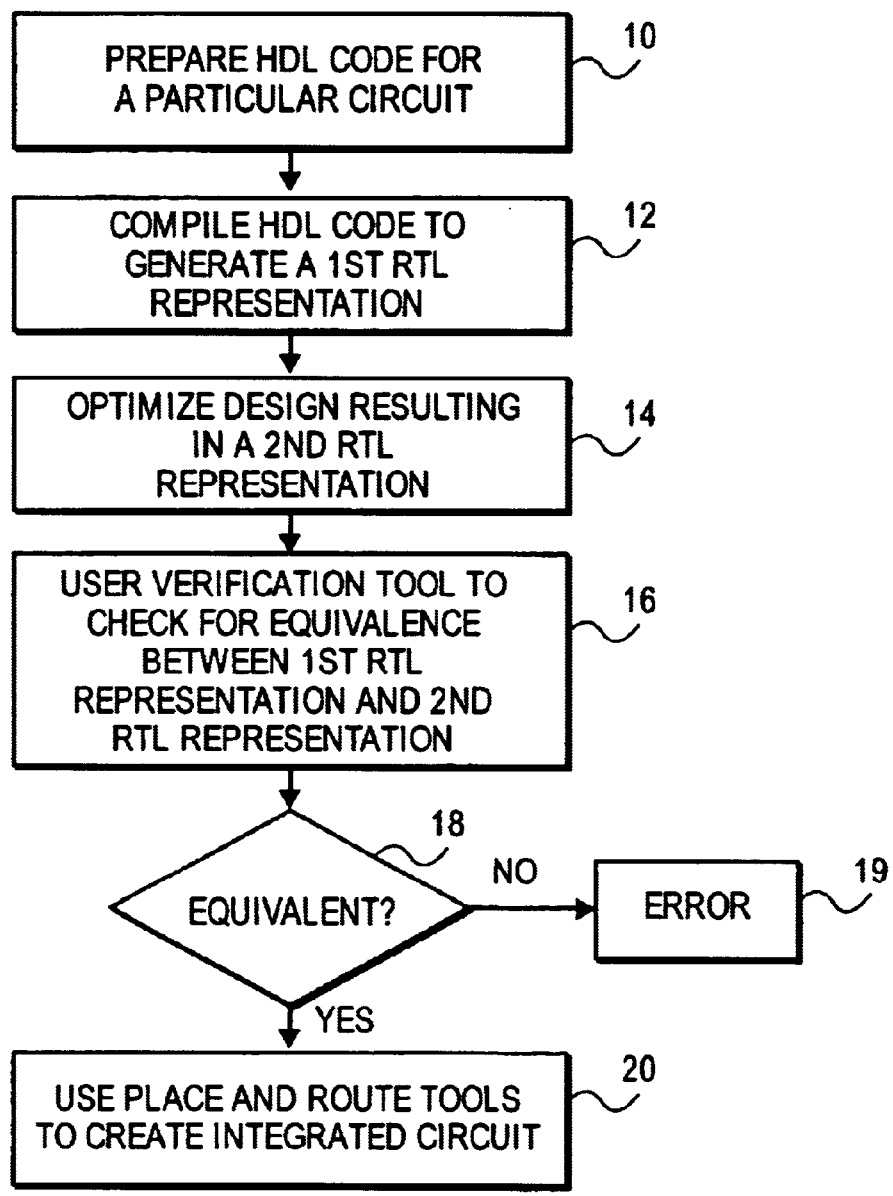
FIG. 1 shows a method according to the prior art for designing integrated circuits.
Figure 2:
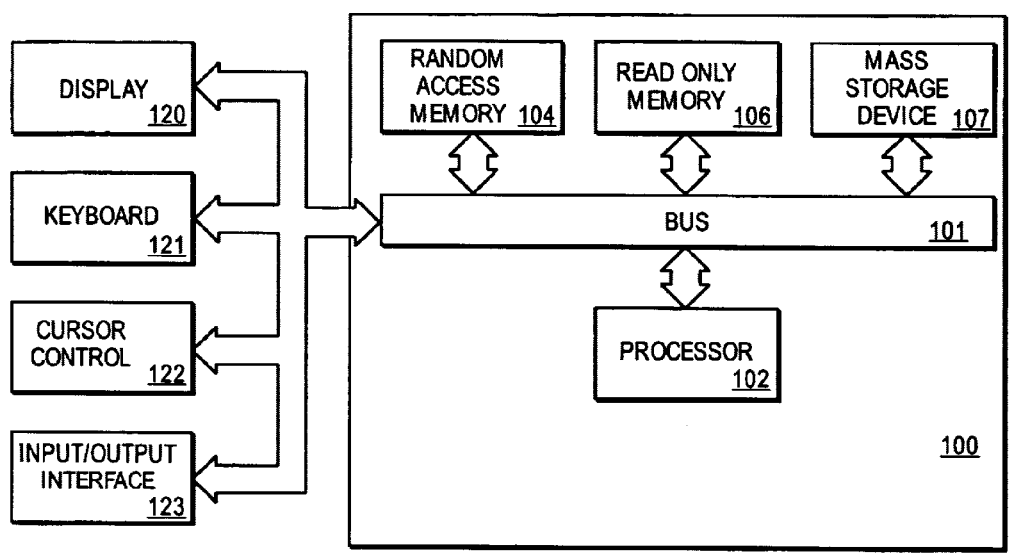
FIG. 2 is a block diagram of a digital processing system that may be used to implement embodiments of the present invention.

Many of the methods of the present invention may be performed with a digital processing system, such as a conventional general purpose computer system. FIG. 2 illustrates a block diagram of a computer system that may be used to implement embodiments of the present invention. The computer system is used to perform logic synthesis of a design that is described in an HDL code in one embodiment. This HDL code may describe a circuit for construction in a field programmable gate array or in an ASIC (application specific integrated circuit). The computer system includes a processor 102 which is coupled through a bus 101 to a random access memory 104 and to a read-only memory 106 and a mass storage device 107. Mass storage device 107 represents a persistent data storage device such as a floppy disk drive, a fixed disk drive (e.g. magnetic drive, optical drive, or the like). Processor 102 may be embodied in a general purpose processor (such as the Intel Pentium processors), a special purpose processor or a specially programmed logic device. Display 120 is coupled to the processor 102 through bus 101 and provides graphical output for the computer system. This graphical output is typically a graphical user interface which may be used to control the operation of the computer system. Keyboard 121 and cursor control device 122 are coupled to the bus 101 for communicating information and command selections to processor 102. The cursor control device 122 may be a mouse or other cursor control device which will be used to control a cursor displayed on the display device 120. Also coupled to the processor 102 through bus 101 is an input/output interface 123 which can be used to control and transfer data to and from electrical devices such as printers and other computers which are coupled to the computer system 100.

It should be noted that the architecture of FIG. 2 is provided for purposes of illustration only and that a computer system or other digital processing system used in conjunction with the present invention is not limited to this specific architecture.

Figure 3:
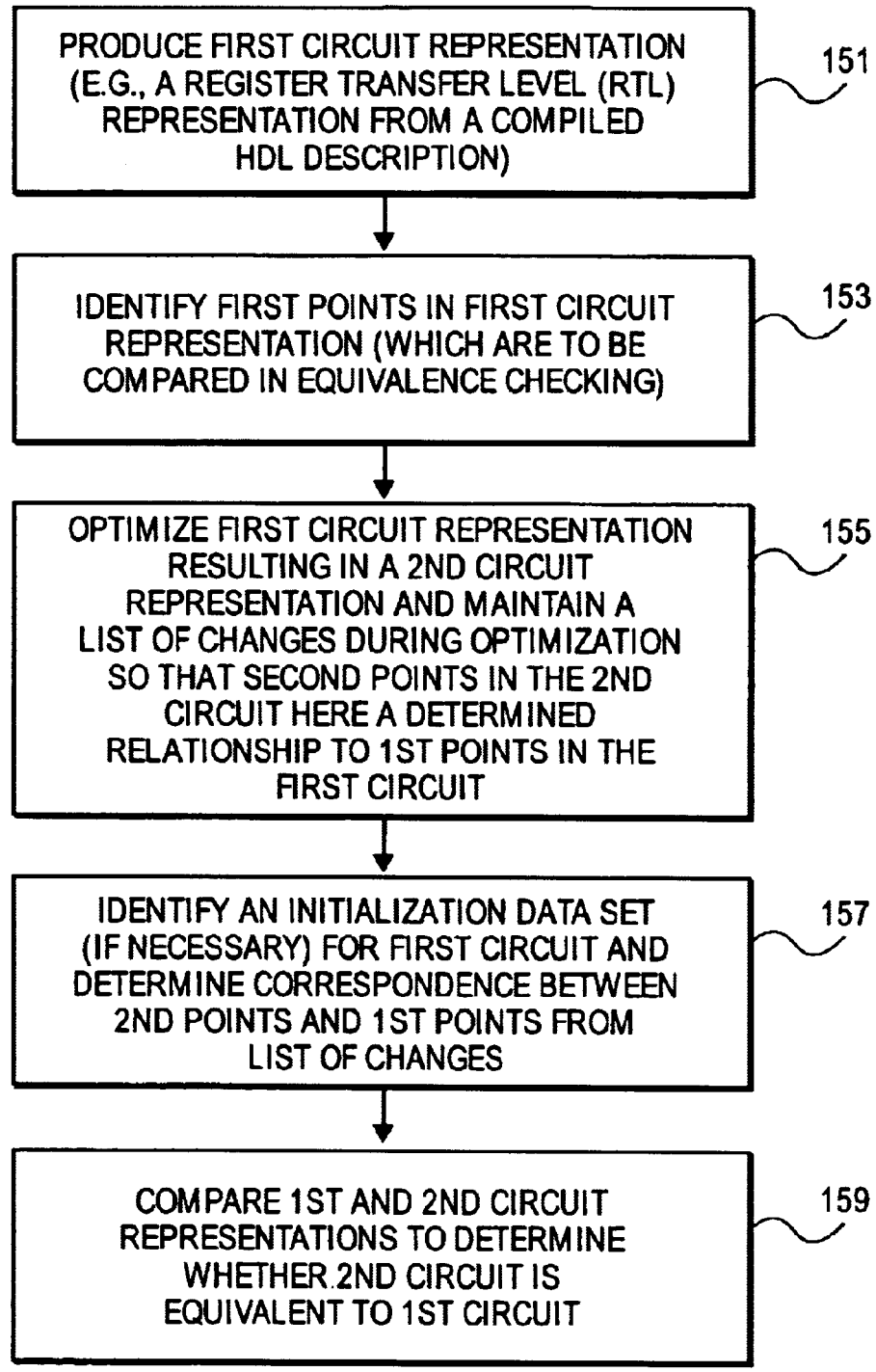
FIG. 3 is a flowchart illustrating an exemplary method of the present invention.

A general example of certain embodiments of the present invention will now be provided while referring to FIG. 3. While most embodiments of the present invention are intended for use in conjunction with HDL design synthesis software, the invention is not necessarily limited to such use. Although use of other languages and computer programs is possible, embodiments of the present invention will be described in the context of the use in HDL software systems, particularly those designed for use with integrated circuits which are synthesized with HDL software tools. Further, the present invention may be used with field programmable gate arrays, which often have particular target architectures which are determined by suppliers of the programmable chips, or the invention may be used with application specific integrated circuits (ASIC) in designing such circuits.

The exemplary method shown in FIG. 3 begins in operation 151 in which a first circuit representation is produced. In one embodiment, this may be a register transfer level (RTL) representation which is compiled from a description of the circuit provided in an HDL description. In operation 153, first points in the first circuit representation are identified. These first points will be used in an equivalence checking operation later in this method. Then in operation 155, the first circuit representation is optimized, resulting in a second circuit representation. During the optimization process, a list of changes made to the first circuit representation is maintained by the synthesis software tool so that second points in the second circuit are known to have a determined relationship relative to and corresponding to the first points in the first circuit. In one particular embodiment of the present invention, the first points in the first circuit representation may be all registers, such as DQ flip-flops, and the second points in the second circuit may be all registers, such as DQ flip-flops. In other embodiments, the first points may be one or all of various different types of sequential elements such as registers, RAM and/or latches. An optimization may be a single optimization process or multiple optimization processes which are performed sequentially over time in order to optimize the circuit. In each case, according to pertinent embodiments of the invention, a list of changes made during the optimization process is maintained so that points in the second circuit can be determined to have a determined relationship (which may be referred to as a transformation) relative and corresponding to a set of points in the first circuit. These determined relationships will be used later in the equivalence checking process. Examples of these determined relationships include the value maps and range maps described further below.

In process element 157, initialization data is identified for the first circuit in those embodiments in which such initialization data is required. Such initialization data is typically used in those circumstances in which the circuit under analysis includes a pipeline loop which has no registers which are matched to registers in the initial circuit. In such circumstances, an initialization process is performed and typically requires determining an initialization sequence and an iteration over several virtual clock cycles in order to derive an equivalent combinational circuit which can be tested for verification. This iteration is performed for both the initial and optimized circuit as described below. A process for determining initialization data often begins by determining the existence of a reset signal which itself establishes an initialization vector which indicates the set of initial signals to initialize the circuit. If a reset signal does not exist, the user may be asked to specify a reset signal or to specify an initial sequence of data to initialize the circuit; the initial sequence of data could also be created from conventional, sequential ATPG (Automatic Test Pattern Generation) tool techniques.

Following any required initialization in process element 157, the correspondence between the first and second points is determined from the list of changes maintained in process element 155. Of course, this correspondence could also be determined in process element 155 as the changes are occurring. The list of changes may be either for each register and/or other sequential elements within the circuit, or for hierarchy ports (which may also be considered points) within each circuit. This correspondence is described further below. It will be appreciated that this is unlike prior art equivalence checking techniques which require registers having user-established names which are tracked through the changes of the circuit. In these prior art techniques, only those registers having such names are tracked through the optimization process; this technique thus only partially maintains any correspondence, and the resulting equivalency checking is inherently flawed for at least this reason.

After process element 157, process element 159 compares the first and second circuit representations to determine whether the second circuit is equivalent to the first circuit. This comparison uses the list which was maintained during the optimization process, which list determines the correspondence between the second points and the first points. Often, this correspondence is between a different number of points (e.g. 3 registers as the first points in the initial/first circuit and 2 registers as the second points in the second/optimized circuit) and the correspondence is specified by known, fixed relationships.

As noted above, the modifications in process element 155 may be a single modification or optimization or a series of optimizations which are intended to optimize the design of the integrated circuit. If the modifications are a series of modifications, then they typically start with the first representation and end with the second representation and various different types of optimizations are performed in sequence starting with the first representation. These optimizations may include sequential redundancy removal, state machine re-encoding, register replication, register retiming, half-cycle scheduling, retiming, pipelining, and conversions between clock gating and enables. After the comparison of process element 159 produces a valid result (e.g. the second circuit is equivalent to the first circuit) then the second circuit may be used to create an integrated circuit through the use of conventional place and route tools or other tools which are known in the art to allow the creation and fabrication of an integrated circuit in a semiconductor substrate.

In a typical embodiment of the present invention, a set of registers in the initial circuit and another set of registers in the modified circuit is maintained in the list as what may be referred to as matched sets of points (which may alternatively be referred to as "equivalent points"). Typically, matched sets of points include value mapping and image information which specify the association between the matched sets of points. The value mapping specifies an original set of data values and the new values they map to for a set of register bits. The image information specifies the valid or legal values for a group of register bits. Typically, the method of the present invention will seek to maintain a sufficient set of matched sets of points to break all pipeline loops. These points may be either registers or hierarchy points in the design. In one particular embodiment of the present invention, all registers in the first circuit (as a first set) and all registers in the second circuit (as a second set) are maintained as matching sets of points. Thus, as registers within the first circuit are modified in order to create the second circuit, the correspondence between the registers in the first circuit and the resulting registers in the second circuit is maintained through the modification process. Often, the modification process results in a change in the number of registers or an encoding or position of registers such that the number or encoding or position of registers in the first set differs from the number or encoding or position of registers in the second set.

In the following description of a method according to the invention, the initial or first circuit of FIG. 3 is referred to as the reference circuit and the second circuit of FIG. 3 is referred to as the implementation circuit. The known equivalent points in both the reference and implementation circuits are located. The circuits are then cut at these points to introduce new primary inputs and outputs. The value maps, such as the value map of FIG. 6B, are implemented by inserting decoding logic at the cut points in the implementation circuit. A software tool according to the present invention, would normally mark equivalent points between clock domains and maintain these equivalent points. In this manner, the reference circuit may produce multiple disjoint circuits resulting from the cuts, and similarly, the implementation circuit may produce multiple circuits as a result of the cuts. Each portion of the reference circuit corresponds to a particular portion of the implementation circuit, and thus there are pairs of reference and implementation circuits, and each pair is verified.

The initialization data set which is required in certain instances of process element 157 may be obtained by using a sequential automatic test pattern generator (ATPG) which attempts to find an initialization sequence for the reference circuit. An asynchronous or synchronous reset signal may be used to establish the initial data set. If a reset signal cannot be found, then the user is asked to specify a reset signal or to specify an initialization sequence. Failure to find an initial data set will normally result in termination of a method according to the present invention, as it is normally difficult to perform the verification process without the initial data set. After obtaining the initial data set, the implementation circuit is evaluated with the initial data set to determine whether it properly initializes by providing output values. This evaluation may require symbolic simulation (e.g. using BDDs [binary decision diagrams] for values) to avoid a failure to initialize. If the initialization data set fails to initialize the implementation circuit, then there is an error and the method terminates. If the primary outputs from the implementation circuit fail to match the values of the outputs of the reference circuit when the initial data set is used to initialize both the reference circuit and the implementation circuit, then there is also an error and the method terminates.

If the implementation circuit is properly initialized with the initialization data set, and if the primary outputs of the implementation circuit from the inputted initialization data set match in value to the outputs of the reference circuit from the inputted initialization data set, then all possible input vectors at equivalent point inputs are tested to verify that the implementation circuit is in fact equivalent to the reference circuit. It will be understood that equivalence between the two circuits means that for all possible legal input values and states, the implementation circuit produces the same output values as the reference circuit produces at its outputs for a given set of input data which is applied to both circuits over time (e.g. over multiple clock cycles).

If all registers are selected as equivalent points in the reference and implementation circuits, then performing equivalence checking is a combinational problem in which the input states are propagated through the logic which contains no registers. However, an alternative set of equivalent points may be chosen such as hierarchy points or ports. In those cases where an initialization sequence is required (see operation 157 in FIG. 3), the reference and implementation circuits are virtually iterated out over several clock cycles. The number of clock cycles depends upon the number of clock cycles needed to first put the reference circuit into an arbitrary, reachable state) and the number of clock cycles needed to observe all states of any given register in both initial and optimized circuits. The iteration over multiple clock cycles causes the registers, such as flip-flops, to become connections between one clock cycle and the next. The initial state of the flip-flops is set to the result of the initialization sequence. The outputs of the implementation and the reference circuits are verified to match at the end of each clock cycle.

Figure 4:
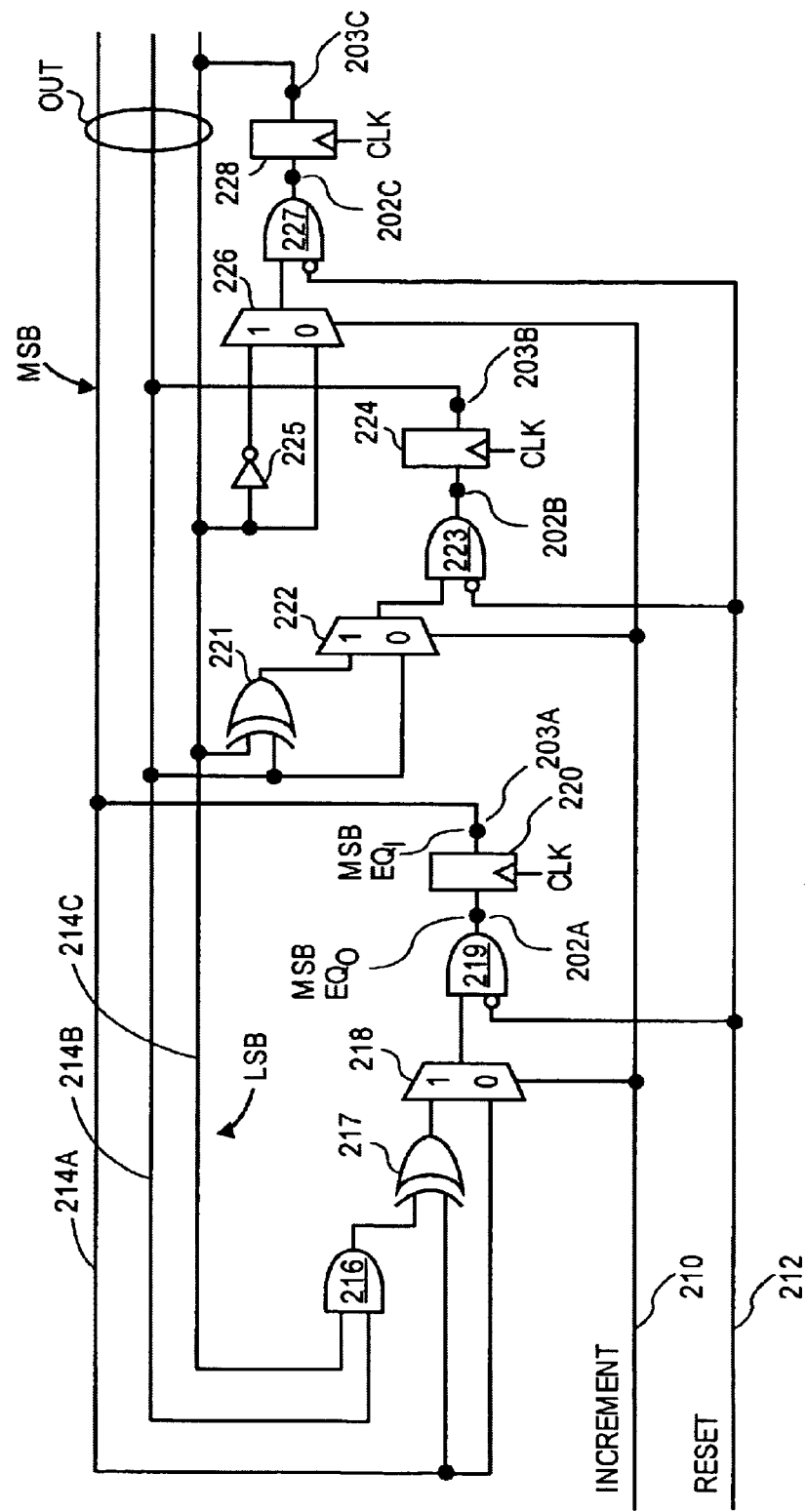
FIG. 4 is an example of a particular representation of a circuit which may be used with the present invention.
Figure 5:
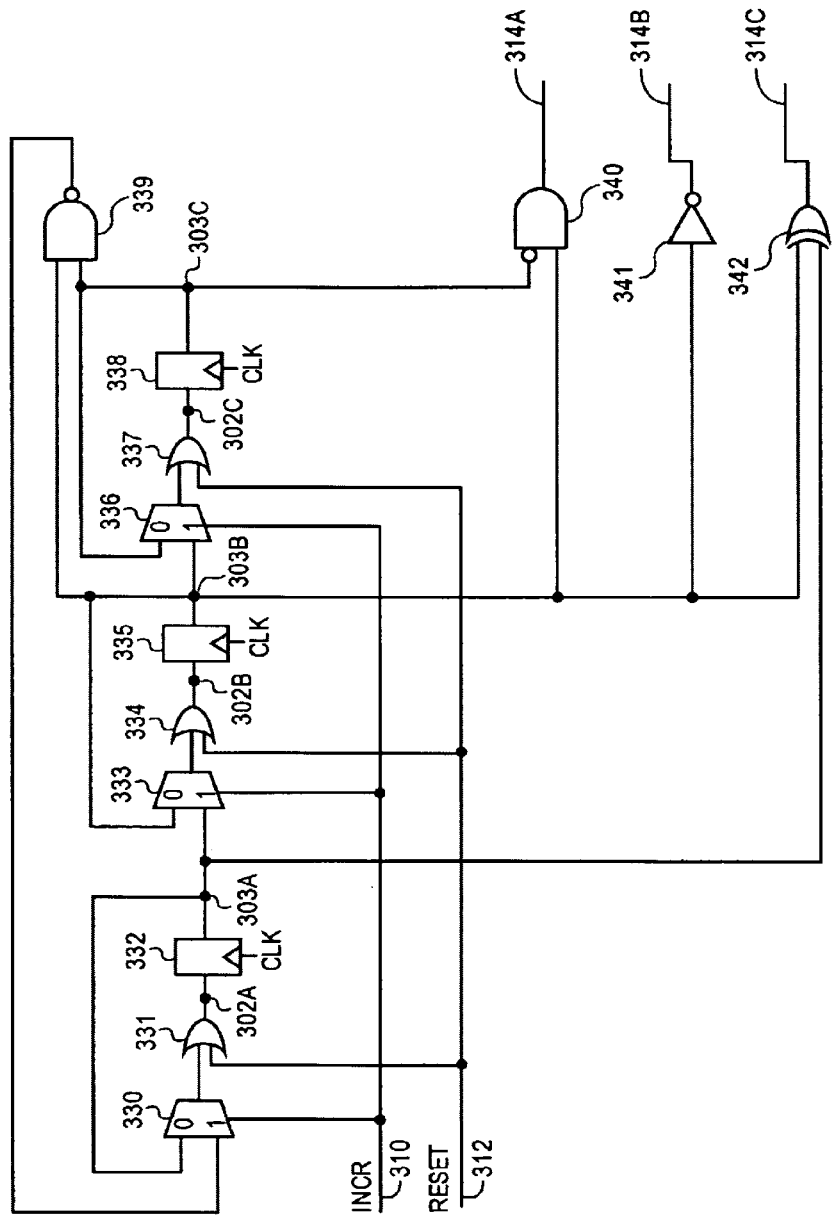
FIG. 5 is an example of an optimized version of the circuit of FIG. 4 which may then be compared through equivalence checking with the circuit of FIG. 4 to verify that the circuit of FIG. 5 is equivalent to the circuit of FIG. 4.

FIG. 4 shows an example of an initial circuit 201 which is optimized or modified to produce the circuit shown in FIG. 5. The circuit 201 is a counter which counts from 0 to 4 on each increment signal 210. Reset signal 212 causes the counter to reset to 000. The increment signal 210 is supplied as the input to the select lines of the multiplexers 218, 222, and 226. As shown in FIG. 4, the output includes lines 214A which represents the most significant bit (MSB) and line 214B and line 214C which represents the least significant bit (LSB). Equivalent points are also shown on the circuit 201. In particular, the equivalent output points are points 202A, 202B, and 202C, where 202A represents the most significant bit of the equivalence output point and point 202C represents the least significant bit Similarly, the equivalent input points are shown as points 203A, 203B, and 203C, where point 203A represents the most significant bit and 203C represents the least significant bit. The circuit 201 of FIG. 4 also includes various logic gates including AND gates 216, 219 223, and 227 as well as XOR gates 217 and 221. The circuit 201 also includes an inverter 225. The circuit of FIG. 4 may be modified as part of a synthesis process. This modification may be a result of attempting to optimize the circuit for a variety of reasons, including performance (e.g. faster operation with a faster clock), or size (smaller semiconductor substrate requirements for the circuit) or power (lower power requirements) or a combination of these factors.

FIG. 5 represents an example of an optimized version of the circuit of FIG. 4. The circuit 301 of FIG. 5 may be considered to be a shift register like version of the counter circuit of FIG. 4. This signal includes an increment signal 310 and a reset signal 312 and provides output lines 314A, 314B, and 314C. Equivalent points are also shown on the circuit 301. These include the equivalence output points 302A, 302B, and 302C as well as the equivalence input points 303A, 303B, and 303C. The equivalence output point 202A in the initial circuit corresponds to the equivalence output point 302A. Similarly, the equivalence output points 202B and 202C correspond respectively to equivalence output points 302B and 302C in circuit 301. Equivalence input points 203A, 203B and 203C correspond respectively to equivalence input points 303A, 303B, and 303C of the circuit 301. The increment signal 310 supplies the input to the select line inputs of the multiplexers 330, 333, and 336. The reset signal line 312 provides an input to the OR gates 331, 334, and 337. The circuit 301 also includes 3 gates 340, 341, and 342 as well as a NAND gate 339.

FIGS. 6A and 6B show the range or image information and the value maps respectively for the circuits shown in FIGS. 4 and 5. In particular, FIG. 6A shows the set of legal values that may be observed at each equivalence output point and each equivalence input point. FIG. 6B shows the value maps indicating the relationship between the equivalent points for the reference circuit and the implementation circuit, in this case FIGS. 4 and 5 respectively. In particular, columns 371 and 372 of FIG. 6B indicate the relationship between the equivalence output point for the initial circuit and the equivalence output point for the optimized circuit. Thus, for example, the output "100" in column 371 for the initial circuit corresponds to the output "110" in 372 for the optimized circuit. Similarly, columns 373 and 374 show the equivalence input point for the initial circuit (in column 373) and the equivalence input point for the optimized circuit (in column 374). These value maps represent the relationship between the equivalent points in the two circuits and allow for the equivalence checking to verify that the optimized or modified circuit is in fact equivalent to the initial circuit or reference circuit. In the example of FIG. 6B, there is a one-to-one relationship (correspondence) between an initial input and its associated optimized input (e.g. 100 [initial input] and 110 [optimized input]), and there is a one-to-one relationship between an initial output and its associated optimized output (e.g. 100 [initial output] and 110 [optimized output]). In general, it is possible for one (1) value in one circuit (e.g. the initial circuit) to map to multiple values in the other circuit (e.g. the optimized circuit) (or a many-to-many mapping is also possible); for example, an optimization of a state machine which minimizes the number of states of the state machine would cause 2 states to merge to one (1) state.

Figure 7A:
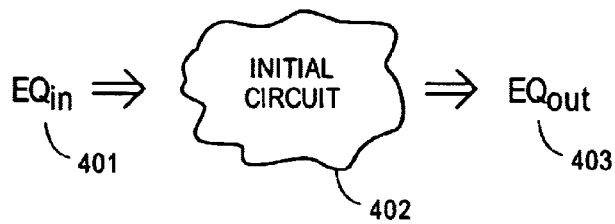
FIG. 7A shows a generalized example in which inputs at equivalent points to initial circuits or circuit produces outputs at equivalent points.
Figure 7B:
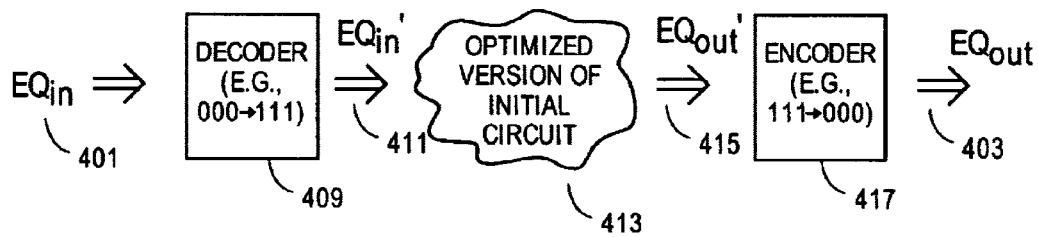
FIG. 7B shows a generalized example in which an optimized version of an initial circuit receives the same input as in FIG. 7A and produces the same output as in FIG. 7A (if the optimized version is equivalent to the initial version) through a process of encoding and decoding, which process of encoding and decoding is represented by value maps, such as that shown in FIG. 6B.

FIGS. 7A and 7B show a generalized example of the present invention. An initial circuit 402 of FIG. 7A receives a set of inputs 401 at the equivalent input points at the initial circuit. The initial circuit 402, given these inputs, provides an output 403 at the equivalent output points for the initial circuit 402. FIG. 7B shows, in a generalized manner, how the equivalence of an optimized version of the initial circuit 413 is compared to the initial circuit 402. The same inputs 401 which were used to check the initial circuit 402 are provided to a decoder 409 which produces the equivalent input point values 411 for the circuit 413 which are then applied to the optimized circuit 413 which then produces the equivalent output point values 415 for the circuit 413 which are then applied to an encoder 417 which produces, if the circuit is equivalent, the same equivalent output values 403. The decoder 409 represents and may be implemented by the value map for the inputs (e.g. the lookup table represented by columns 373 and 374 of FIG. 6B) and the encoder 417 represents and may be implemented by the value map for the output of the circuit (e.g. the lookup table represented by columns 371 and 372 of FIG. 6B). It can be seen that the legal set of input values at the equivalent input points can be supplied to the initial circuit 402 and also to the decoder 409. The initial circuit 402 will produce output values for each given input value and these can be compared against corresponding output values for the corresponding input values from the optimized version of the initial circuit 413. Each input value to decoder 409 is decoded to produce an input 411 which is then propagated through the circuit 413 to provide an output 415 which is then encoded by the encoder 417 to produce the output 403 which should match the output 403 from the initial circuit 402 if the circuit 413 is equivalent to the initial circuit 402. If the output from the encoder 417 for a given input does not match the output for that input provided by the initial circuit, then the optimized version of the circuit 413 is not equivalent to the initial circuit 402.

FIGS. 8A, 8B and 8C provide another example of an initial circuit and an optimized or modified version of the circuit as well as the value maps which are used to test the equivalence of the two circuits. In particular, circuit 501 of FIG. 8A is a decoder which decodes 2 inputs 502A and 502B using 4 AND gates 503, 505, 507, and 509 in conjunction with 4 D flip-flops or registers 512, 514, 516, and 518. The circuit 501 further includes an OR gate 521 and an inverter 520. Equivalence input points are shown as points 510A, 510B, 510C, and 510D. The equivalence output points are shown as points 511A, 511B, 511C, and 511D. The modified version of the circuit is shown in FIG. 8B as circuit 551 and includes the same equivalence points. The value map shown in FIG. 8C shows the mapping between values at an equivalence input point in the initial circuit (column 576) and the equivalence input points in the modified circuit (column 577). Thus, for example, the input "0001" in the initial circuit corresponds to and maps to the input "0001" in the equivalent input point as shown in column 577. Similarly, columns 578 and 579 represent the relationship or correspondence between the equivalent output point in the initial circuit and the equivalent output point in the modified circuit. For example, the output "0001" in column 578 which is an equivalent output point in the initial circuit corresponds to the equivalent output point in the modified circuit of the output "0001." Thus columns 578 and 579 represent a lookup table which may be considered to be the encoder 417 in the case of the circuit 551. Once the optimization process produces the modified version of the circuit 551 shown in FIG. 8B, a further optimization may be performed by removing the AND gates 503, 505, and 507 and registers 512, 514 and 516 from circuit 551 and using the output 525 of FIG. 8B to drive the load(s) which would have been driven by nodes/points 511A, 511B and 511C. Thus, the output 525 of circuit 551 also drives the load(s) driven by output 523 of FIG. 8A.

Figure 9:
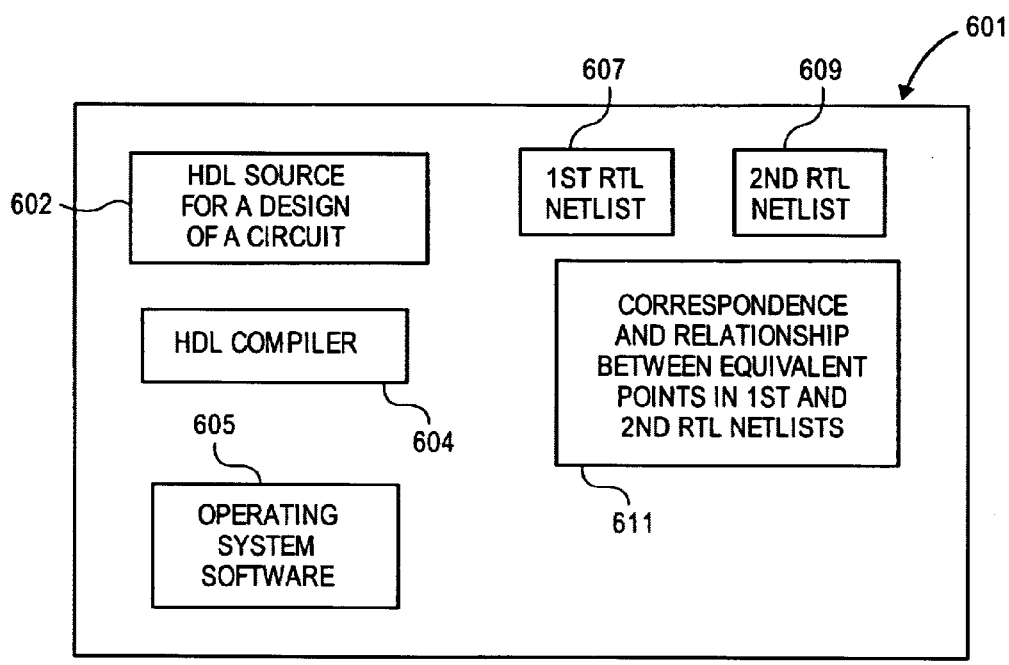
FIG. 9 shows an example of a machine readable media according to one embodiment of the present invention.

One embodiment of the present invention may be a circuit design and synthesis computer-aided design software that is implemented as a computer program which is stored in a machine readable media, such as a CD-ROM or a magnetic hard disk or an optical disk or various other alternative storage devices. FIG. 9 shows an example of such media 601. In the example shown in FIG. 9, a source code HDL file 602 is stored in the memory or media and, after compilation of the source code, a first RTL netlist 607 is also stored in the media After at least one modification of the circuit represented by the first RTL netlist, a second RTL netlist 609 is stored in the media The media also includes conventional operating system software 605 in certain embodiments, and typically also includes an HDL compiler 604 which performs the compilation of the HDL source to produce an RTL netlist. The media also includes data 611 which stores the correspondence and relationship between the equivalent points in the first and the second RTL netlists.

In a typical implementation, the media of FIG. 9 will be a non-volatile memory such as a CD-ROM or a magnetic hard disk which will retain the programming instructions necessary to perform the various processes of the embodiments of the present invention and will also typically include volatile memory such as DRAM or other memory for storing information which does not have to be permanently saved. This information may include the data 611 after the circuit has been verified The operations of the various methods of the present invention may be implemented by a processing unit in a digital processing system which executes sequences of computer program instructions which are stored in a memory which may be considered to be a machine readable storage media. The memory may be random access memory, read only memory, a persistent storage memory, such as mass storage device or any combination of these devices. Execution of the sequences of instruction causes the processing unit to perform operations according to the present invention. The instructions may be loaded into memory of the computer from a storage device or from one or more other digital processing systems (e.g. a server computer system) over a network connection. The instructions may be stored concurrently in several storage devices (e.g. DRAM and a hard disk, such as virtual memory). Consequently, the execution of these instructions may be performed directly by the processing unit. In other cases, the instructions may not be performed directly or they may not be directly executable by the processing unit. Under these circumstances, the executions may be executed by causing the processor to execute an interpreter that interprets the instructions, or by causing the processor to execute instructions which convert the received instructions to instructions which can be directly executed by the processor. In other embodiments, hard wired circuitry may be used in place of or in combination with software instructions to implement the present invention. Thus, the present invention is not limited to any specific combination of hardware circuitry and software, nor to any particular source for the instructions executed by the computer or digital processing system.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of designing an integrated circuit (IC), said method comprising:

identifying a first plurality of points in a first representation of a circuit which represents at least a portion of said IC;

modifying said first representation to produce a second representation which differs from said first representation;

maintaining a list of changes made during said modifying, wherein said modifying produces at least one change in said list; and identifying from said list a correspondence between a second plurality of points in said second representation and said first plurality of points, wherein the correspondence is suitable to be used for comparing said first representation with said second representation at said first plurality and said second plurality of points, said comparing indicating whether said first representation is equivalent to said second representation.

2. A method as in claim 1 further comprising:
wherein said list determines said correspondence between said second plurality of points and said first plurality of points.

3. A method as in claim 2 wherein said modifying comprises a series of modifications starting with said first representation and ending with said second representation.

4. A method as in claim 3 wherein said series of modifications comprises a series of optimizations which are intended to optimize the design of said IC.

5. A method as in claim 2 wherein said modifying comprises optimizing said first representation.

6. A method as in claim 5 wherein said optimizing comprises at least one of: (a) sequential redundancy removal; (b) state machine re-encoding; (c) register replication; (d) register retiming; and (e) conversion between clock gating and enables.

7. A method as in claim 5 wherein said list comprises a logical relationship between a subset of said first plurality of points and a corresponding subset of said second plurality of points.

8. A method as in claim 2 further comprising:
compiling a text representation of a logic circuit to produce said first representation.

9. A method as in claim 8 wherein said text representation is written in a hardware description language (HDL) and wherein said first representation is at a register transfer level (RTL).

10. A method as in claim 2 wherein an initialization vector is determined for said first representation and is used in comparing said first representation with said second representation.

11. A method as in claim 2 wherein said first plurality of points comprise registers in said first representation and said second plurality of points comprise registers in said second representation.

12. A method as in claim 1 further comprising:
partitioning the first representation into a first plurality of sub-representations based on the first plurality of points;
partitioning the second representation into a second plurality of sub-representations based on the second plurality of points; and
independently verifying each of the second plurality of sub-representations against corresponding one of the first plurality of sub-representations.

13. A method as in claim 1 wherein at least a portion of the correspondence is maintained when the first representation includes a loop.

14. A method as in claim 1 wherein said comparison is performed by an equivalence checker and wherein at least a portion of the correspondence is maintained for the equivalence checker when the equivalence checker is unable to perform said comparison based on a set of matching points generated by the equivalence checker.

15. A computer readable medium containing executable computer program instructions which when executed by a processing system cause said processing system to perform a method of designing an integrated circuit (IC), said method comprising:
identifying a first plurality of points in a first representation of a circuit which represents at least a portion of said IC;
modifying said first representation to produce a second representation which differs from said first representation;
maintaining a list of changes made during said modifying, wherein said modifying produces at least one change in said list; and
identifying from said list a correspondence between a second plurality of points in said second representation and said first plurality of points,
wherein the correspondence is suitable to be used for comparing said first representation with said second representation at said first plurality and said second plurality of points, said comparing indicating whether said first representation is equivalent to said second representation.

16. A computer readable medium as in claim 15, wherein said list determines said correspondence between said second plurality of points and said first plurality of points.

17. A computer readable medium as in claim 16 wherein said modifying comprises a series of modifications starting with said first representation and ending with said second representation.

18. A computer readable medium as in claim 17 wherein said series of modifications comprises a series of optimizations which are intended to optimize the design of said IC.

19. A computer readable medium as in claim 16 wherein said modifying comprises optimizing said first representation.

20. A computer readable medium as in claim 19 wherein said optimizing comprises at least one of: (a) sequential redundancy removal; (b) state machine re-encoding; (c) register replication; (d) register retiming; and (e) conversion between clock gating and enables.

21. A computer readable medium as in claim 19 wherein said list comprises a logical relationship between a subset of said first plurality of points and a corresponding subset of said second plurality of points.

22. A computer readable medium as in claim 16 further comprising:
compiling a text representation of a logic circuit to produce said first representation.

23. A computer readable medium as in claim 22 wherein said text representation is written in a hardware description language (HDL) and wherein said first representation is at a register transfer level (RTL).

24. A computer readable medium as in claim 16 wherein an initialization vector is determined for said first representation and is used in comparing said first representation with said second representation.

25. A computer readable medium as in claim 16 wherein said first plurality of points comprise registers in said first representation and said second plurality of points comprise registers in said second representation.

26. A computer readable medium as in claim 15 wherein the method further comprises:
partitioning the first representation into a first plurality of sub-representations based on the first plurality of points;
partitioning the second representation into a second plurality of sub-representations based on the second plurality of points; and
independently verifying each of the second plurality of sub-representations against corresponding one of the first plurality of sub-representations.

27. A computer readable medium as in claim 15 wherein at least a portion of the correspondence is maintained when the first representation includes a loop.

28. A computer readable medium as in claim 15 wherein said comparison is performed by an equivalence checker and wherein at least a portion of the correspondence is maintained for the equivalence checker when the equivalence checker is unable to perform said comparison based on a set of matching points generated by the equivalence checker.

29. A system for designing an integrated circuit (IC), said system comprising:
    means for identifying a first plurality of points in a first representation of a circuit which represents at least a portion of said IC;
    means for modifying said first representation to produce a second representation which differs from said first representation;
    means for maintaining a list of changes made during said modifying, wherein said modifying produces at least one change in said list; and
    means for identifying from said list a correspondence between a second plurality of points in said second representation and said first plurality of points,
    wherein the correspondence is suitable to be used for comparing said first representation with said second representation at said first plurality and said second plurality of points, said comparing indicating whether said first representation is equivalent to said second representation.

30. A system as in claim 29 wherein said list determines said correspondence between said second plurality of points and said first plurality of points.

31. A system as in claim 30 wherein said means for modifying performs a series of modifications starting with said first representation and ending with said second representation.

32. A system as in claim 31 wherein said series of modifications comprises a series of optimizations which are intended to optimize the design of said IC.

33. A system as in claim 30 wherein said means for modifying performs an optimization of said first representation.

34. A system as in claim 33 wherein said optimization comprises at least one of: (a) sequential redundancy removal; (b) state machine re-encoding; (c) register replication; (d) register retiming; and (e) conversion between clock gating and enables.

35. A system as in claim 33 wherein said list comprises a logical relationship between a subset of said first plurality of points and a corresponding subset of said second plurality of points.

36. A system as in claim 30 further comprising:
    means for compiling a text representation of a logic circuit to produce said first representation.

37. A system as in claim 36 wherein said text representation is written in a hardware description language (HDL) and wherein said first representation is at a register transfer level (RTL).

38. A system as in claim 30 wherein an initialization vector is determined for said first representation and is used in comparing said first representation with said second representation.

39. A system as in claim 30 wherein said first plurality of points comprise registers in said first representation and said second plurality of points comprise registers in said second representation.

40. A system as in claim 29 further comprising:
    means for partitioning the first representation into a first plurality of sub-representations based on the first plurality of points;
    means for partitioning the second representation into a second plurality of sub-representations based on the second plurality of points; and
    means for independently verifying each of the second plurality of sub-representations against corresponding one of the first plurality of sub-representations.

41. A system as in claim 29 wherein at least a portion of the correspondence is maintained when the first representation includes a loop.

42. A system as in claim 29 wherein said comparison is performed by an equivalence checker and wherein at least a portion of the correspondence is maintained for the equivalence checker when the equivalence checker is unable to perform said comparison based on a set of matching points generated by the equivalence checker.

43. A method of designing an integrated circuit (IC), said method comprising:
    modifying a first representation of a circuit, which represents at least a portion of said IC, to produce a second representation which differs from said first representation;
    determining first simulated states for said first representation, said first simulated states derived from an initialization sequence over a plurality of simulated clock cycles; and
    comparing said first representation with said second representation based on relationships between said first simulated states and corresponding second simulated states of said second representation, said comparing indicating whether said first representation is equivalent to said second representation.

44. A method as in claim 43, further comprising:
    determining said second simulated states for said second representation, said second simulated states derived over said plurality of simulated clock cycles.

45. A method as in claim 44 wherein a number of said plurality of simulated clock cycles is based on a first number of clock cycles required to initialize said circuit and a second number of clock cycles required to observe output values for a given sequential element.

46. A method as in claim 45 wherein said given sequential element is a clocked register.

* * * * *